(12) United States Patent
Priest et al.

(10) Patent No.: US 9,514,628 B2
(45) Date of Patent: Dec. 6, 2016

(54) ELECTRICAL LOAD MONITORING SYSTEM

(71) Applicant: Bell Helicopter Textron Inc., Fort Worth, TX (US)

(72) Inventors: Thomas Priest, Orange, CT (US); Mark Berkley, Hurst, TX (US); David Fuessel, Euless, TX (US); Josh Seifert, Benbrook, TX (US); Eric Ransom, Flower Mound, TX (US); David Meek, Mansfield, TX (US); Donald L. Krempin, Dallas, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 14/670,097

(22) Filed: Mar. 26, 2015

(65) Prior Publication Data

US 2016/0284195 A1    Sep. 29, 2016

(51) Int. Cl.
*G08B 21/00*   (2006.01)
*G08B 21/18*   (2006.01)

(52) U.S. Cl.
CPC .................................. *G08B 21/182* (2013.01)

(58) Field of Classification Search
None
See application file for complete search history.

(56) References Cited

U.S. PATENT DOCUMENTS

| | | | |
|---|---|---|---|
| 6,411,869 B2 * | 6/2002 | Permanne | 244/17.11 |
| 7,414,544 B2 | 8/2008 | Oltheten et al. | |
| 2002/0190576 A1 * | 12/2002 | Kern | H02J 3/38 307/18 |
| 2006/0181839 A1 * | 8/2006 | Yamada | B60K 37/02 361/627 |
| 2006/0287778 A1 * | 12/2006 | Oltheten | G01D 7/002 701/1 |
| 2007/0111045 A1 * | 5/2007 | Hirata | G05F 1/67 429/431 |
| 2007/0198141 A1 * | 8/2007 | Moore | B64D 43/00 701/3 |
| 2008/0180263 A1 | 7/2008 | Lathrop et al. | |
| 2009/0306839 A1 * | 12/2009 | Youngquist | G01K 7/021 701/14 |

(Continued)

OTHER PUBLICATIONS

Communication pursuant to Article 94(3) EPC in EP Application No. 16162099.2 issued on Aug. 16, 2016, 6 pages.

*Primary Examiner* — Ojiako Nwugo

(57) ABSTRACT

A computer implemented method performed by a composite electrical load monitoring system includes determining, at a first time instant during a duration, a first margin between a first reading of a first electrical parameter and a first electrical parameter limit for a first power source, and determining, at the first time instant during the duration, a second margin between a second reading of a second electrical parameter and a second electrical parameter limit for a second power source. The method further includes determining, after the first time instant, that the first margin is less than the second margin in response to determining the first margin and the second margin, and displaying, in a display device and within the duration, an identifier for the first power source in response to determining that the first margin is less than the second margin.

20 Claims, 4 Drawing Sheets

(56) References Cited

U.S. PATENT DOCUMENTS

2012/0197558 A1* 8/2012 Henig ............... G01K 11/265
                                                                                     702/58
2015/0039146 A1* 2/2015 Wei ................. G05B 13/026
                                                                                     700/291

* cited by examiner

ELECTRICAL LOAD MONITORING SYSTEM

TECHNICAL FIELD

This disclosure relates to monitoring electrical loads in systems with multiple power sources, e.g., in rotorcrafts and aircrafts.

BACKGROUND

Rotorcraft electrical load gauges often display current electrical loads for multiple power sources on the rotorcraft. For example, a rotorcraft pilot often monitors an ammeter and/or voltmeter for each power source on a rotorcraft with knowledge of maximum current or voltage each power source is able to provide. The pilot makes decisions with regard to electrical load management based on the individual ammeters and/or voltmeters, and can reduce, divert, or otherwise manage electrical loads on a rotorcraft. For example, if a pilot sees a first generator close to its maximum current load, the pilot can divert certain electrical systems of a rotorcraft to draw current from a second generator that is not as close to its maximum current load, instead of drawing current from the first generator.

SUMMARY

This disclosure describes electrical load monitoring systems, for example, for monitoring electrical power sources on a combined gauge display.

In some aspects, a composite electrical load monitoring system includes one or more computer systems and a computer-readable medium storing instructions executable by the one or more computer systems to perform operations. The operations include determining, at a first time instant during a duration, a first margin between a first reading of a first electrical parameter and a first electrical parameter limit for a first power source, and determining, at the first time instant during the duration, a second margin between a second reading of a second electrical parameter and a second electrical parameter limit for a second power source. The operations include determining, after the first time instant, that the first margin is less than the second margin in response to determining the first margin and the second margin, and displaying, in a display device and within the duration, an identifier for the first power source in response to determining that the first margin is less than the second margin.

This, and other aspects, can include one or more of the following features. The operations can include displaying, in the display device and in response to determining that the first margin is less than the second margin, a graphical representation of the first margin and an identifier for the first electrical parameter. Displaying the graphical representation of the first margin can include displaying, in the display device and in a first color, a first region representing the first electrical parameter limit, and displaying, in the display device and in a second color, a second region representing the first reading of the first electrical parameter, the second region encompassed by the first region, where a difference between an area of the first region and an area of the second region represents the first margin. The first margin can be a percentage margin defined as a ratio of a difference between the first electrical parameter limit and the first reading of the first electrical parameter at the first time instant, and the first electrical parameter limit. The operations can include determining, at a second time instant during the duration and after the first time instant, a third margin between a third reading of the first electrical parameter and the first electrical parameter limit for the first power source, determining, at the second time instant, a fourth margin between a fourth reading of the second electrical parameter and the second electrical parameter limit for the second power source, determining, after the second time instant and within the duration, that the fourth margin is less than the third margin in response to determining the third margin and the fourth margin, and replacing, in the display device and within the duration, the identifier for the first power source with an identifier for the second power source in response to determining that the fourth margin is less than the third margin. The operations can include displaying, in the display device and in response to determining that the fourth margin is less than the third margin, a graphical representation of the fourth margin and an identifier for the second electrical parameter. The identifier for the first power source can be a first identifier, and the operations can include displaying, in the display device and within the duration, a second identifier for the second power source, and displaying the first identifier to be visually different from the second identifier. The first power source and the second power source can be power sources of a rotorcraft, and the duration can be during operation of the rotorcraft. The operations can include determining, in real-time, the first reading of the first electrical parameter, and determining, in real-time, the second reading of the second electrical parameter. Determining the first margin and determining the second margin can include detecting the first reading of the first electrical parameter and the second reading of the second electrical parameter at a frequency greater than one hertz. The first electrical parameter can include at least one of voltage, current load, power load, or temperature, the second electrical parameter can include at least one of voltage, current load, power load, or temperature, the first electrical parameter limit can include at least one of maximum voltage, rated voltage, minimum voltage, maximum current load, rated current load, maximum power load, rated power load, maximum operating temperature, or trip-point temperature of the first power source, and the second electrical parameter limit can include at least one of maximum voltage, rated voltage, minimum voltage, maximum current load, rated current load, maximum power load, rated power load, maximum operating temperature, or trip-point temperature of the second power source. The first electrical parameter can be different than the second electrical parameter. The first electrical parameter and the second electrical parameter can be the same. Determining the first margin can include determining the first margin based on a moving average of a number of consecutive readings of the electrical parameter for the first power source, and determining the second margin can include determining the second margin based on a moving average of a number of consecutive readings of the electrical parameter for the second power source. The first power source and the second power source can each include at least one of a generator, an auxiliary power unit, or a battery.

Some aspects of the subject matter described here can be implemented as a computer-implemented method. The method includes determining, at a first time instant during a duration, a first margin between a first reading of a first electrical parameter and a first electrical parameter limit for a first power source, determining, at the first time instant during the duration, a second margin between a second reading of a second electrical parameter and a second electrical parameter limit for a second power source, determining, after the first time instant, that the first margin is less than the second margin in response to determining the first margin and the second margin, and displaying, in a display device and within the duration, an identifier for the first power source in response to determining that the first margin is less than the second margin.

This, and other aspects, can include one or more of the following features. The method can include displaying, in the display device and in response to determining that the first margin is less than the second margin, a graphical representation of the first margin and an identifier for the first electrical parameter. The method can include determining, at a second time instant during the duration and after the first time instant, a third margin between a third reading of the first electrical parameter and the first electrical parameter limit for the first power source, determining, at the second time instant, a fourth margin between a fourth reading of the second electrical parameter and the second electrical parameter limit for the second power source, determining, after the second time instant and within the duration, that the fourth margin is less than the third margin in response to determining the third margin and the fourth margin, and replacing, in the display device and within the duration, the identifier for the first power source with an identifier for the second power source in response to determining that the fourth margin is less than the third margin.

Some aspects of the subject matter described here can be implemented as a non-transitory, computer readable medium storing instructions operable when executed to cause at least one processor to perform operations. The operations include determining, at a first time instant during a duration, a first margin between a first reading of a first electrical parameter and a first electrical parameter limit for a first power source, determining, at the first time instant during the duration, a second margin between a second reading of a second electrical parameter and a second electrical parameter limit for a second power source, determining, after the first time instant, that the first margin is less than the second margin in response to determining the first margin and the second margin, and displaying, in a display device and within the duration, an identifier for the first power source in response to determining that the first margin is less than the second margin.

This, and other aspects, can include one or more of the following features. The operations can include determining, at a second time instant during the duration and after the first time instant, a third margin between a third reading of the first electrical parameter and the first electrical parameter limit for the first power source, determining, at the second time instant, a fourth margin between a fourth reading of the second electrical parameter and the second electrical parameter limit for the second power source, determining, after the second time instant and within the duration, that the fourth margin is less than the third margin in response to determining the third margin and the fourth margin, and replacing, in the display device and within the duration, the identifier for the first power source with an identifier for the second power source in response to determining that the fourth margin is less than the third margin.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
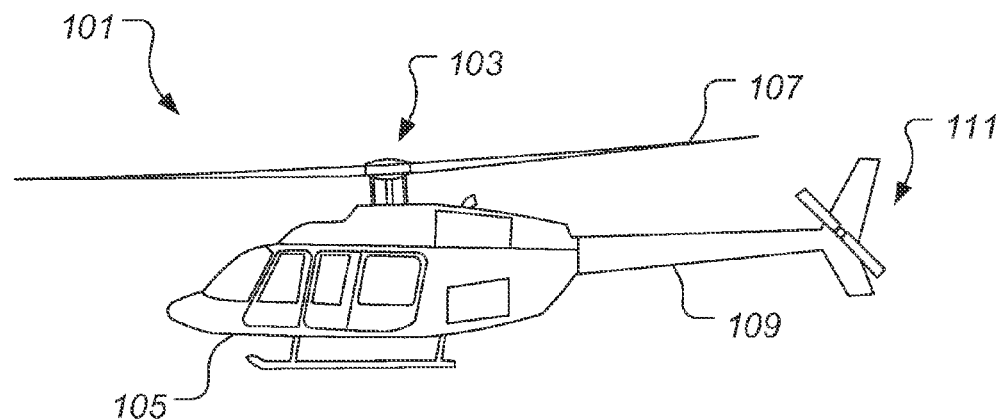
FIG. 1 is a schematic side view of an example helicopter.

This disclosure describes an electrical load monitoring system, for example, including a composite display of electrical output information from multiple power sources on a rotorcraft or aircraft. A rotorcraft or aircraft often includes multiple power sources, such as generators, batteries, auxiliary power units (APUs), and/or other power sources that supply power, interchangeably or not interchangeably, to various electrical components of the rotorcraft or aircraft. Electrical output, such as voltage, current load, power load (e.g., in watts or volt-amperes), other electrical loads, or indications of electrical loading (e.g., temperature) are monitored and can vary between power sources. Similarly, electrical load limits can vary between power sources.

In conventional electrical load monitoring systems, a pilot of a rotorcraft or aircraft must observe and analyze individual ammeters and/or voltmeters displaying actual electrical loads for each of the multiple power sources and determine available electrical loads remaining on each power source. For example, a pilot determines a power source to supply power to an electrical system or component based on the multiple gauges displaying actual electrical loads on the power sources. However, this disclosure describes an example electrical load monitoring system including a composite display, where the electrical load monitoring system monitors electrical loads for multiple power sources on a rotorcraft or aircraft. The example electrical load monitoring system compares the difference (e.g., percentage difference or actual difference) between an electrical parameter reading (i.e., electrical load) and an electrical parameter limit (i.e., electrical load limit) for each power source. The example electrical load monitoring system can then display, on the composite display, a graphical representation of the difference between the electrical parameter reading and the electrical parameter limit for a power source with its electrical parameter reading (i.e., electrical load) closest to its electrical parameter limit (i.e., electrical load limit). For example, the graphical representation can represent the power source with the smallest difference between the present electrical load and the electrical load limit without displaying electrical load information for the remaining power sources of the rotorcraft. In other words, the electrical load monitoring system displays information for a power source operating closest to its electrical load limit, such as a maximum operable limit, a rated electrical load, and/or other electrical load limit.

In some implementations, displaying electrical information only for the power source that is closest to its output limit clearly directs a pilot to relevant electrical information regarding electrical loads on the power sources of a rotorcraft or aircraft, while hiding from display electrical information that is not relevant or is not an issue at that instant. For example, displaying electrical information only for one power source avoids crowding or information overload for a pilot or crewmember in a cockpit of a rotorcraft or aircraft, thereby decreasing a workload on the pilot or crewmember. In some implementations, the electrical load monitoring system provides a single, concise, and real-time indication of electrical load and electrical power margin available for a power source.

Figure 2:
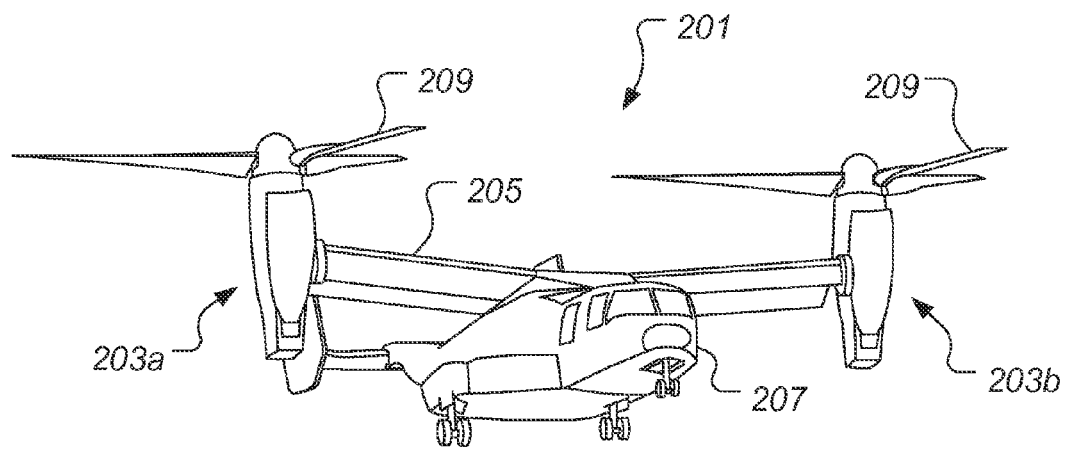
FIG. 2 is a schematic side view of an example tiltrotor aircraft.

FIGS. 1 and 2 are schematic diagrams of two different rotorcrafts, an example helicopter 101 and an example tiltrotor aircraft 201, respectively, that can each implement an electrical load monitoring system with a composite display. However, this disclosure is applicable to any aircraft, rotorcraft, or other system that includes multiple electrical power sources. FIG. 1 is a side view of the example helicopter 101, while FIG. 2 is an oblique view of the example tiltrotor aircraft 201. Helicopter 101 includes a rotary system 103 carried by a fuselage 105. Rotor blades 107 connected to the rotary system 103 provide flight for helicopter 101. The rotor blades 107 are controlled by multiple controllers within fuselage 105. The pitch of each rotor blade 107 can be manipulated to selectively control direction, thrust, and lift of the helicopter 101. For example, during flight a pilot can manipulate cyclic controllers in a cockpit of the fuselage 105 for changing the pitch angle of rotor blades 107 and/or manipulate pedals in the cockpit of fuselage 105 to provide vertical, horizontal, and yaw flight movement. Helicopter 101 can further include an anti-torque system 111 and an empennage 109.

Tiltrotor aircraft 201 includes two rotary systems 203a and 203b attached to a fuselage 207 by wings 205. The rotary systems 203a and 203b have multiple proprotors 209 carried by rotatable nacelles. The rotatable nacelles provide means for allowing aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit of fuselage 207, for causing movement of the aircraft.

Figure 3:
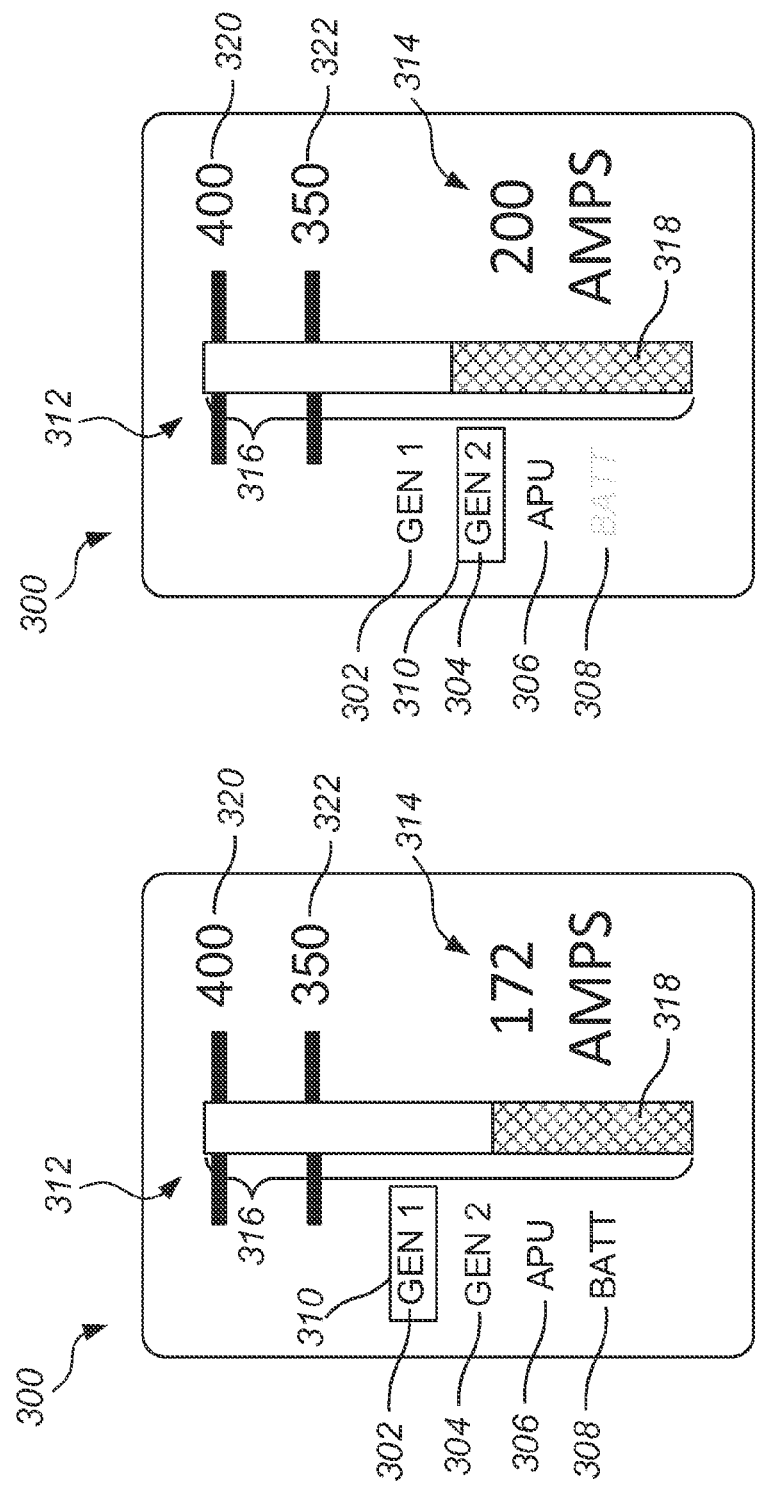
FIGS. 3A and 3B are example displays of an electrical load monitoring system showing electrical load data at a first time instant and a second time instant, respectively.

Example helicopter 101 and example tiltrotor aircraft 201 can each implement an example electrical load monitoring system with a composite display, such as the example composite display 300 of FIG. 3A. The example display 300 shows electrical load information for one power source of multiple power sources on a rotorcraft (e.g., example helicopter 101) or aircraft (e.g., tiltrotor aircraft 201) that are monitored by the example electrical load monitoring system. In the example electrical load monitoring system and example display 300 of FIG. 3A, the multiple power sources include a first generator 302 labeled "GEN 1," a second generator 304 labeled "GEN 2," an auxiliary power unit 306 labeled "APU," and a battery 308 labeled "BATT." In some implementations, the multiple power sources can include additional or different power sources. The example electrical load monitoring system determines, at multiple time instant during a duration, a margin between an electrical parameter reading and an electrical parameter limit for each power source of the multiple power sources on the rotorcraft or aircraft. The margin is the difference between the electrical parameter reading and the electrical parameter limit for the respective power source. After each time instant, the electrical load monitoring system displays, for example, on the example display 300, an identifier for the power source with the smallest margin. The power source with the smallest margin is sometimes referred to as the controlling power source.

In an example, a first power source is the first generator 302 and a second power source is the battery 308. At a first time instant, the example electrical load monitoring system can determine a margin between a maximum current load of the first generator 302 and a current load of the first generator 302 drawn at the first time instant. The electrical load monitoring system can also determine a margin between a maximum voltage of the battery 308 and a voltage of the battery 308 drawn at the first time instant. Based on the two margins, the electrical load monitoring system can identify which of the first generator 302 or the battery 308 has the smallest margin. The electrical load monitoring system can also identify which of the first generator 302, second generator 304, auxiliary power unit 306, and battery 308 has the smallest margin.

The example display 300 of FIG. 3A correlates to a first time instant, where the first generator 302 is the controlling power source because the margin of the first generator 302 is smaller than the margins of the second generator 304, auxiliary power unit 306, and battery 308 at the first time instant. The display 300 includes a controlling identifier 310 around "GEN 1." The controlling identifier 310 is shown in FIG. 3A as a box around "GEN 1," however, the controlling identifier 310 can take many forms. For example, the controlling identifier 310 can include a shaped outline, an alteration of the respective text (e.g., shading, highlighting, increasing or decreasing text size, changing font style, and/or other), an arrow, and/or other indication of selection to differentiate the controlling power source, in this case the first generator 302 labeled "GEN 1," from the other power sources.

The electrical parameter that the electrical parameter reading and electrical parameter limit are based off of can be the same for each power source, or one or more electrical parameters can be different among the power sources. The electrical parameter reading for each power source can include a measurement of voltage, current, power, temperature, and/or other electrical parameter or indication of electrical loading. For example, the electrical parameter reading for the first generator 302 is a reading of electrical current (e.g., amps). In some examples, an electrical parameter reading for different power sources can measure different electrical parameters. For example, the electrical parameter reading for the first generator 302, the second generator 304, and auxiliary power unit 306 can be a measurement of current (e.g., amps), whereas an electrical parameter reading for the battery 308 can be a measurement of voltage (e.g., volts). The electrical parameter limit for each power source can include a maximum voltage, rated voltage, minimum voltage, maximum current load, rated current load, maximum power load, rated power load, maximum operating temperature, trip-point temperature, and/or other electrical parameter limit. The electrical parameter limit can correlate to a manufacturer standard limit for a power source, a manufacturer recommended limit for a power source, an operator-determined limit, a load that a power source is expected to be able to handle under specified conditions, a maximum load that a power source can handle under specified conditions, an arbitrary limit, and/or another limit. In certain implementations, the electrical parameter readings and the electrical parameter limits can be affected by external factors, such as a flight mode of a rotorcraft, altitude, pressure, and/or other factors.

The example display 300 includes a graphical representation 312 of the margin associated with the controlling power source and an electrical parameter identifier 314 corresponding to the electrical parameter and the electrical parameter reading for the controlling power source. The electrical parameter identifier 314 is shown in FIG. 3A as "172 AMPS," where 172 amps is the electrical parameter reading for the first generator 302 at the first time instant, and current is the electrical parameter being measured for the first generator 302. The graphical representation 312 can take many forms. For example, as depicted in FIG. 3A, the graphical representation 312 includes a first region 316 representing the electrical parameter limit for the first generator 302 and a second region 318 representing the electrical parameter reading for the first generator 302 at the first time instant. The difference between the area of the first region 316 and the area of the second region 318 represents the margin. In some implementations, the first region 316 is colored or shaded, and the second region 318 is colored or shaded differently than the first region 316.

The graphical representation 312 also includes an electrical parameter limit indication 320 representing the electrical parameter limit for the first generator 302. For example, the electrical parameter limit indication 320 includes "400," representing the electrical parameter limit of 400 amps for the first generator 302. In some implementations, such as depicted in FIG. 3A, the graphical indication 312 also includes a rated limit indication 322 representing a rated electrical parameter limit for the first generator 302. For example, the rated limit indication 322 includes "350," representing the rated electrical parameter limit of 350 amps for the first generator 302. Although the example display 300 depicts both the electrical parameter limit indication 320 and the rated limit indication 322, the display 300 can exclude one or both indications 320 and 322. In certain instances, the graphical representation 312 depicts a clear indication of the margin between the electrical parameter load and the electrical parameter limit for the controlling power source (i.e., the power source with the smallest margin).

In some implementations, the margin for each power source is a percentage margin defined as a ratio of the difference between the electrical parameter limit for the respective power source and the electrical parameter reading of the respective power source, and the electrical parameter limit of the respective power source. In other words, the percentage margin can be defined as the ratio of unused electrical capacity of a power source relative to the maximum capacity of the power source. For example, referring to FIG. 3A where the electrical parameter reading for the first generator 302 at a first time instant is 172 amps and an electrical parameter limit is 400 amps, the percentage margin is (400−172/400), or 57%. In certain implementations, the margin for each power source is the actual difference between the electrical parameter limit and the electrical parameter reading for the respective power source. For example, referring to FIG. 3A, the actual difference is 400−172, or 228.

The electrical parameter readings for one or more power sources can be determined in substantially real-time (e.g., at a very high frequency, instantaneously, and/or continuously determined), at a specified frequency, arbitrarily, and/or another way by the example load monitoring system in response to user input and/or in response to a preset condition being satisfied. Substantially real-time can include instances in which a time lapse between an input and an output is imperceptible to a user, for example, a time lapse as small as 1 millisecond or less. In a real-time operation, the example load monitoring system can provide an output in response to an input as quickly as the system's resources allow. In implementations where the electrical parameter readings are determined at a specified frequency, the frequency can be greater than or equal to one hertz (e.g., five hertz). Referring to FIG. 3A, the example electrical monitoring system can determine electrical parameter readings for the first generator 302, second generator 304, auxiliary power unit 306, and the battery 308 at a frequency of one hertz or greater. For example, at a frequency of one hertz, electrical parameter readings for each power source are determined every second by the electrical monitoring system. After one or more electrical parameter readings are determined, the electrical monitoring system determines a margin for each power source and determines the power source with the smallest margin.

In some implementations, the margin is determined at each reading of the electrical parameter for a power source, and the time instants correlate to each determination of the margin. For example, for an electrical parameter measurement frequency of one hertz, an electrical parameter reading is determined every second, and corresponding margins are determined at each second. In other words, a frequency of the time instants is the same frequency that the electrical parameter readings are measured.

In some implementations, the margin is determined based on a moving average of a number of consecutive electrical parameter readings. In some examples, the margin can be based on an average reading of two or more consecutive electrical parameter readings. For example, for an electrical parameter measurement frequency of one hertz, an electrical parameter reading is determined every second. However, a margin can be determined, for example, every two or more seconds based on an average of the multiple electrical parameter readings over the two or more seconds. In another example, for an electrical parameter measurement frequency of five hertz, a first time instant at zero seconds, and a second time instant at one second, a margin determined at the second time instant can be based on an average electrical parameter reading of the five electrical parameter measurements between the first time instant and the second time instant (e.g., between zero seconds and one second).

In some implementations, filtering can be applied to the electrical parameter readings. For example, the example electrical load monitoring system can ignore or adjust outlier electrical parameter readings if the outlier readings vary from an average electrical parameter reading by a specified amount (e.g., +1-35%, +/−100 amps, and/or other amount). In some examples, the electrical load monitoring system can ignore small changes in the electrical parameter readings based on meeting a minimum change level, such as exceeding +/−1%, +/−5 amps, and/or other amount. In certain examples, the example electrical load monitoring system can require a specified (i.e., minimum) number of consecutive electrical parameter readings to be above a specified value before adjusting the displayed value or displayed output limit ratio scales, for example, as shown in composite display 300 of FIGS. 3A and 3B.

In some implementations, the margin is determined based on a measurement pattern or sequence. For example, the margin can be determined at a time instant based on every fifth electrical parameter reading. In certain instances, basing the margin on a moving average or a measurement pattern or sequence reduces and/or removes influence of an outlier electrical parameter reading.

The margins for each power source are determined at several time instants throughout the duration. In some implementations, as mentioned above, the time instants are dependent on the electrical parameter measurement frequency. In some implementations, the time instants are not dependent on the electrical parameter measurement frequency. For example, an electrical parameter measurement frequency can be five hertz, and the frequency of the time instants can be 1 hertz. The duration can span any length of time, for example, any number of minutes, hours, days, and/or other sequence of time. In certain instances, the duration includes a flight duration for a rotorcraft or aircraft. As mentioned above, at each time instant, the example load monitoring system determines the smallest margin and the power source associated with the smallest margin. After determining the smallest margin and the power source associated with the smallest margin, the example electrical load monitoring system can then display information corresponding to the controlling power source on a composite display, such as the example display 300 of FIG. 3A.

FIG. 3B depicts the example display 300 of FIG. 3A, except at a second time instant in the duration. In the example electrical load monitoring system and example display 300 of FIG. 3B, the second generator 304 has the smallest margin and is the controlling power source at the second time instant. The controlling identifier 310 is a box around "GEN 2," indicating that the second generator 304 is the controlling power source. In FIG. 3B, the graphical representation 312 of the margin corresponds with the second generator 304 such that the first region 316 represents the electrical parameter limit for the second generator 304 and the second region 318 represents the electrical parameter reading for the second generator 304. The electrical parameter identifier 314 of FIG. 3B is "200 AMPS," where 200 amps is the electrical parameter reading for the second generator 304 at the second time instant. During operation of the example electrical load monitoring system, the display 300 can be automatically updated based on the determined margins of the active power sources. For example, the controlling identifier 310, graphical representation 312, and electrical parameter identifier 314 can be automatically updated (e.g., in real time or at a specified frequency) when a different power source becomes the controlling power source during operation of the electrical load monitoring system. In some implementations, the example electrical load monitoring system updates the display 300 based on a pilot input, an update schedule, a flight condition, and/or other factors.

In some implementations, a margin for a first power source and a margin for a second power source can be substantially the same. For example, a margin for the first generator 302 and a margin for the battery 308 each can be 35%. The example electrical load monitoring system can store a power source hierarchy, such that in instances when margins for multiple power sources are substantially the same, the controlling power source is selected based at least in part on an importance or significance of the power sources available. The hierarchy of power sources can change, for example, based on a flight mode of a rotorcraft or aircraft utilizing the example electrical load monitoring system. For example, during engine ignition of a rotorcraft utilizing the example electrical load monitoring system and example display 300 of FIG. 3A, a hierarchy of power sources can include a power source order of the battery 308, auxiliary power unit 306, first generator 302, and second generator 304, in order of importance. In some examples, such as during rotorcraft takeoff, a hierarchy of power sources can include a power source order of the first generator 302, the second generator 304, the auxiliary power unit 306, and the battery 308, in order of importance.

In some implementations, one or more of the power sources go offline. For example, a power source can fail, disconnect, turn off, and/or otherwise lack an electrical output. In certain instances, a label for a power source that is offline can retain an identifier that dissociates the power source from the available power sources displayed on the example display 300. FIG. 3B depicts an offline status the battery 308, for example, by italicizing and shading the "BATT" label. In some implementations, an additional or different power source goes offline, and the respective label retains a text alteration on the example display 300 associated with an offline power source. The text alteration can include shading, highlighting, varying font style, and/or other alteration or identifier. In some implementations, power sources go offline based on a flight mode of a rotorcraft or aircraft. For example, during an engine ignition mode of a rotorcraft or aircraft, the auxiliary power unit 306 and battery 308 can produce electrical output, while the first generator 302 and second generator 304 are offline. In some examples, during a cruise flight mode of a rotorcraft or aircraft, the first generator 302 and second generator 304 produce electrical output, while the auxiliary power unit 306 and battery 308 are offline.

In some implementations, including instances when the controlling power source is the battery 308, the example display 300 can include a remaining time indication correlating to an estimated time remaining before the controlling power source (e.g., battery 308) is depleted. For example, the remaining time indication can include a text string "EST TIME REMAINING: 18 MIN."

FIGS. 3A and 3B show the graphical representation 312 of the margin as a shaded bar-type or tape-type representation. However, the graphical representation 312 can be different. For example, the graphical representation 312 can include a circular representation, column representation, linear representation, bar chart, area chart, and/or other representation of the margin.

Figure 4:
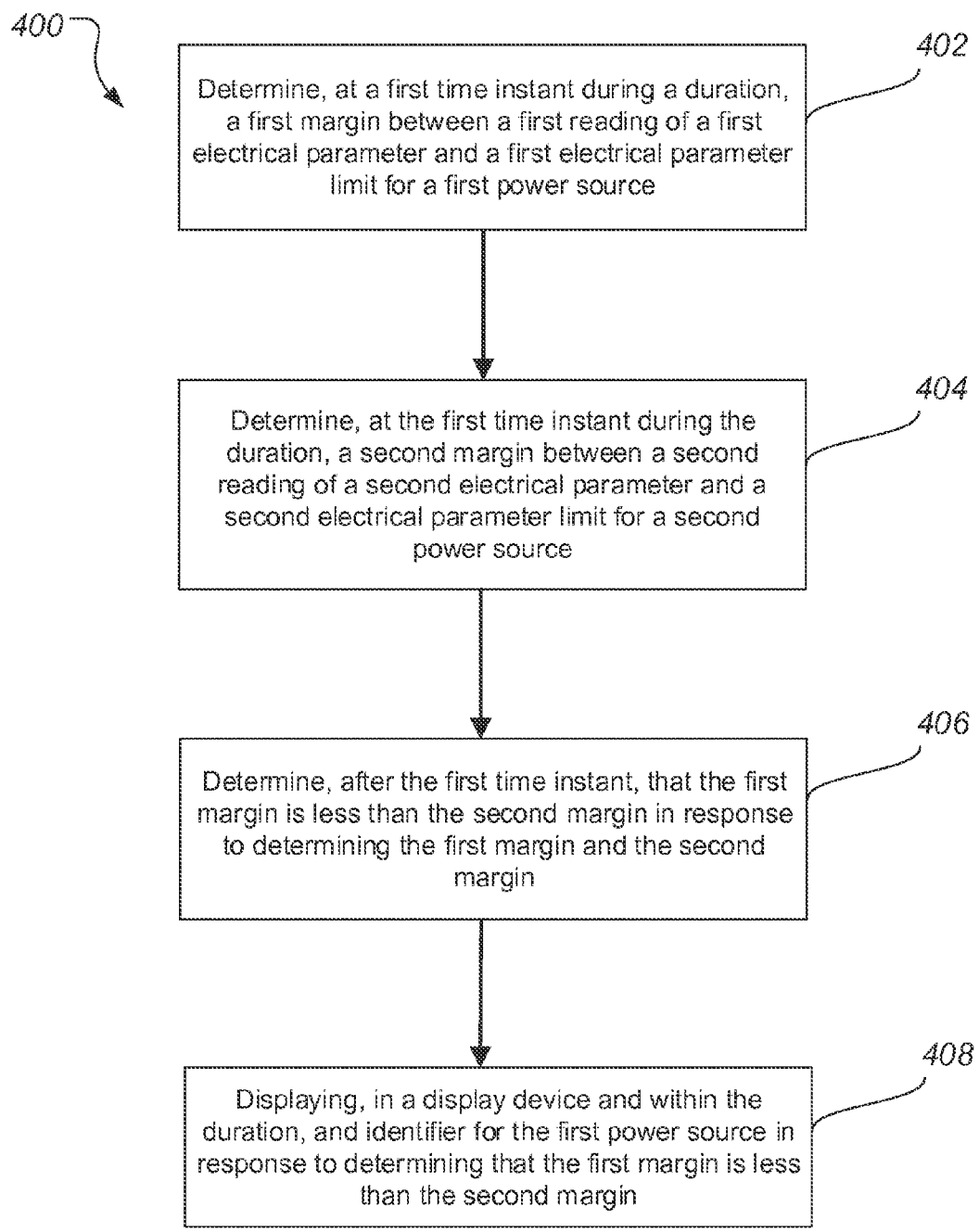
FIG. 4 is a flowchart describing an example process for monitoring electrical loads on a rotorcraft.
Figure 5:
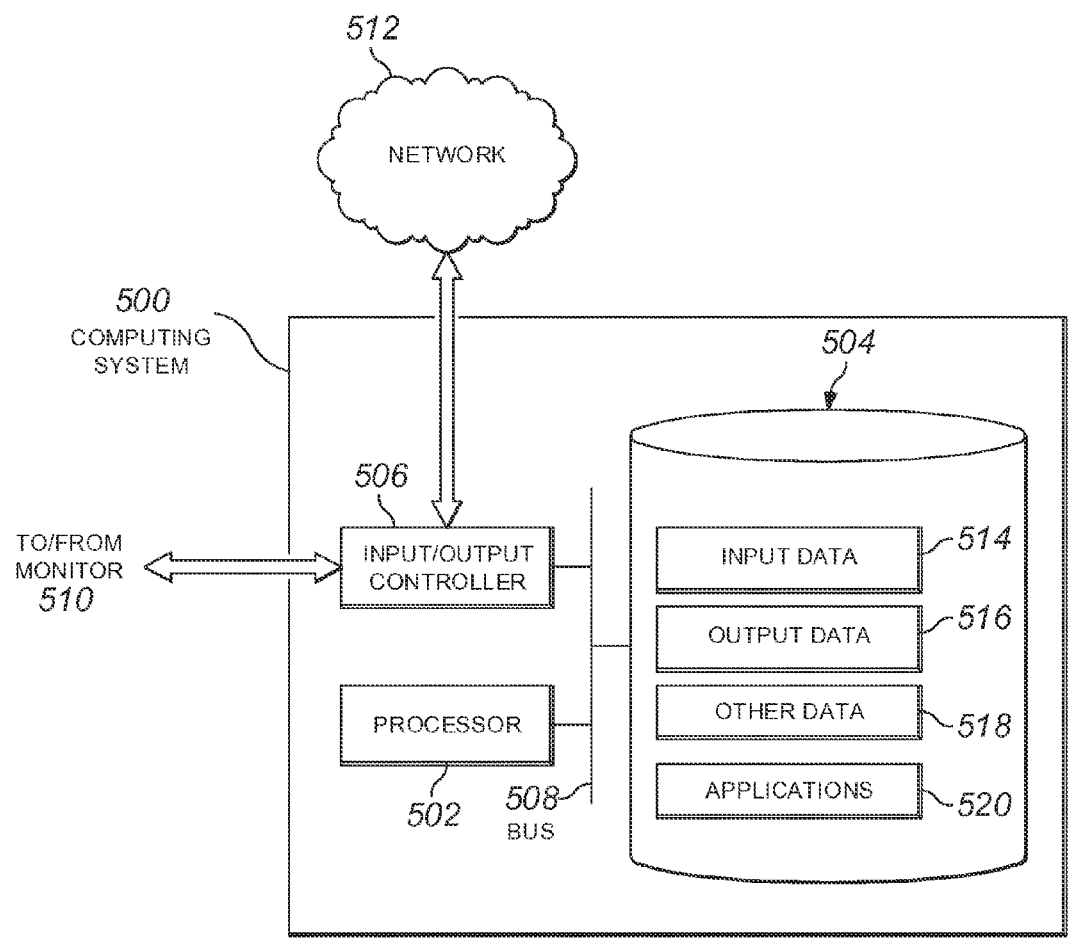
FIG. 5 illustrates an example architecture of an example computing system.

FIG. 4 is a flowchart describing an example process 400 for monitoring electrical loads on a rotorcraft, for example, performed by the example electrical load monitoring system described above. FIG. 5 illustrates an example architecture of an example computing system 500 (e.g., computer) that can implement processes of monitoring electrical loads on a rotorcraft, for example, example process 400 of FIG. 4. The example computing system 500 can be located on a rotorcraft, aircraft, or other system utilizing an electrical load monitoring system. The example computing system 500 includes one or more processors 502, a computer-readable medium 504 (e.g., a memory), and input/output controllers 506 communicably coupled by a bus 508. The computer-readable medium 504 can include, for example, a random access memory (RAM), a storage device (e.g., a writable read-only memory (ROM) and/or others), a hard disk, and/or another type of storage medium. The computer-readable medium 504 can include readable and/or writable data including input data 514, output data 516, application data 520, and/or other data 518. The computing system 500 can be preprogrammed and/or it can be programmed (and reprogrammed) by loading a program from another source (e.g., from a CD-ROM, from another computing device through a data network, and/or in another manner). The input/output controller 506 is coupled to input/output devices (e.g., monitor 510) and to a network 512. The input/output devices receive and transmit data in analog or digital form over communication links such as a serial link, wireless link (e.g., infrared, radio frequency, and/or others), parallel link, and/or another type of link.

At 402, a first margin between a first reading of a first electrical parameter and a first electrical parameter limit is determined for a first power source at a first time instant during a duration. For example, computing system 500 can determine the first margin between the first reading of the first electrical parameter and the first electrical parameter limit for the power source at the first time instant during the duration. At 404, a second margin between a second reading of a second electrical parameter and a second electrical parameter limit is determined for a second power source at the first time instant during the duration. For example, computing system 500 can determine the second margin between the second reading of the second electrical parameter and the second electrical parameter limit for the second power source at the first time instant during the duration. At 406, after the first time instant, the first margin is determined to be less than the second margin in response to determining the first margin and the second margin. For example, the computing system 500 can determine, after the first time instant, the first margin to be less than the second margin in response to determining the first margin and the second margin. At 408, an identifier for the first power source is displayed in a display device within the duration in response to determining that the first margin is less than the second margin. For example, computing system 500 can display, in the display device (e.g., monitor 510), the identifier for the first power source within the duration in response to determining that the first margin is less than the second margin.

A number of implementations have been described. Nevertheless, it will be understood that various modifications may be made without departing from the spirit and scope of the disclosure.

What is claimed is:

1. A composite electrical load monitoring system comprising: one or more computer systems; and a non-transitory computer-readable medium storing instructions executable by the one or more computer systems to perform operations comprising: determining, at a first time instant during a duration, a first margin between a first reading of a first electrical parameter and a first electrical parameter limit for a first power source; determining, at the first time instant during the duration, a second margin between a second reading of a second electrical parameter and a second electrical parameter limit for a second power source; determining, after the first time instant, that the first margin is less than the second margin in response to determining the first margin and the second margin; and displaying, in a display device and within the duration, an identifier for the first power source in response to determining that the first margin is less than the second margin.

2. The system of claim 1, the operations further comprising displaying, in the display device and in response to determining that the first margin is less than the second margin, a graphical representation of the first margin and an identifier for the first electrical parameter.

3. The system of claim 2, wherein displaying the graphical representation of the first margin comprises:
displaying, in the display device and in a first color, a first region representing the first electrical parameter limit; and
displaying, in the display device and in a second color, a second region representing the first reading of the first electrical parameter, the second region encompassed by the first region, wherein a difference between an area of the first region and an area of the second region represents the first margin.

4. The system of claim 1, wherein the first margin is a percentage margin defined as a ratio of a difference between the first electrical parameter limit and the first reading of the first electrical parameter at the first time instant, and the first electrical parameter limit.

5. The system of claim 1, the operations further comprising:
determining, at a second time instant during the duration and after the first time instant, a third margin between a third reading of the first electrical parameter and the first electrical parameter limit for the first power source;
determining, at the second time instant, a fourth margin between a fourth reading of the second electrical parameter and the second electrical parameter limit for the second power source;
determining, after the second time instant and within the duration, that the fourth margin is less than the third margin in response to determining the third margin and the fourth margin; and
replacing, in the display device and within the duration, the identifier for the first power source with an identifier for the second power source in response to determining that the fourth margin is less than the third margin.

6. The system of claim 5, the operations further comprising displaying, in the display device and in response to determining that the fourth margin is less than the third margin, a graphical representation of the fourth margin and an identifier for the second electrical parameter.

7. The system of claim 1, wherein the identifier for the first power source is a first identifier, and wherein the operations further comprise:
displaying, in the display device and within the duration, a second identifier for the second power source; and
displaying the first identifier to be visually different from the second identifier.

8. The system of claim 1, wherein the first power source and the second power source are power sources of a rotorcraft, and wherein the duration is during operation of the rotorcraft.

9. The system of claim 1, wherein the operations comprise:
determining, in real-time, the first reading of the first electrical parameter; and
determining, in real-time, the second reading of the second electrical parameter.

10. The system of claim 1, wherein determining the first margin and determining the second margin comprises detecting the first reading of the first electrical parameter and the second reading of the second electrical parameter at a frequency greater than one hertz.

11. The system of claim 1, wherein the first electrical parameter comprises at least one of voltage, current load, power load, or temperature;
wherein the second electrical parameter comprises at least one of voltage, current load, power load, or temperature;
wherein the first electrical parameter limit comprises at least one of maximum voltage, rated voltage, minimum voltage, maximum current load, rated current load, maximum power load, rated power load, maximum operating temperature, or trip-point temperature of the first power source; and wherein the second electrical parameter limit comprises at least one of maximum voltage, rated voltage, minimum voltage, maximum current load, rated current load, maximum power load, rated power load, maximum operating temperature, or trip-point temperature of the second power source.

12. The system of claim 1, wherein the first electrical parameter is different than the second electrical parameter.

13. The system of claim 1, wherein the first electrical parameter and the second electrical parameter are the same.

14. The system of claim 1, wherein determining the first margin comprises determining the first margin based on a moving average of a number of consecutive readings of the electrical parameter for the first power source; and wherein determining the second margin comprises determining the second margin based on a moving average of a number of consecutive readings of the electrical parameter for the second power source.

15. The system of claim 1, wherein the first power source and the second power source each comprises at least one of a generator, an auxiliary power unit, or a battery.

16. A computer implemented method, comprising:

determining, at a first time instant during a duration, a first margin between a first reading of a first electrical parameter and a first electrical parameter limit for a first power source;

determining, at the first time instant during the duration, a second margin between a second reading of a second electrical parameter and a second electrical parameter limit for a second power source;

determining, after the first time instant, that the first margin is less than the second margin in response to determining the first margin and the second margin; and displaying, in a display device and within the duration, an identifier for the first power source in response to determining that the first margin is less than the second margin.

17. The method of claim 16, further comprising displaying, in the display device and in response to determining that the first margin is less than the second margin, a graphical representation of the first margin and an identifier for the first electrical parameter.

18. The method of claim 16, further comprising:

determining, at a second time instant during the duration and after the first time instant, a third margin between a third reading of the first electrical parameter and the first electrical parameter limit for the first power source;

determining, at the second time instant, a fourth margin between a fourth reading of the second electrical parameter and the second electrical parameter limit for the second power source;

determining, after the second time instant and within the duration, that the fourth margin is less than the third margin in response to determining the third margin and the fourth margin; and replacing, in the display device and within the duration, the identifier for the first power source with an identifier for the second power source in response to determining that the fourth margin is less than the third margin.

19. A non-transitory, computer readable medium storing instructions operable when executed to cause at least one processor to perform operations comprising:

determining, at a first time instant during a duration, a first margin between a first reading of a first electrical parameter and a first electrical parameter limit for a first power source;

determining, at the first time instant during the duration, a second margin between a second reading of a second electrical parameter and a second electrical parameter limit for a second power source;

determining, after the first time instant, that the first margin is less than the second margin in response to determining the first margin and the second margin; and displaying, in a display device and within the duration, an identifier for the first power source in response to determining that the first margin is less than the second margin.

20. The non-transitory, computer readable medium of claim 19, the operations further comprising:

determining, at a second time instant during the duration and after the first time instant, a third margin between a third reading of the first electrical parameter and the first electrical parameter limit for the first power source;

determining, at the second time instant, a fourth margin between a fourth reading of the second electrical parameter and the second electrical parameter limit for the second power source;

determining, after the second time instant and within the duration, that the fourth margin is less than the third margin in response to determining the third margin and the fourth margin; and replacing, in the display device and within the duration, the identifier for the first power source with an identifier for the second power source in response to determining that the fourth margin is less than the third margin.

* * * * *